United States Patent
Piening et al.

[11] Patent Number: 5,924,649
[45] Date of Patent: Jul. 20, 1999

[54] AIRCRAFT WITH SUPPORTING WINGS HAVING MEMBERS FOR TAKING UP TENSILE AND COMPRESSIVE FORCES

[75] Inventors: Matthias Piening; Arno Pabsch; Christof Sigle, all of Braunschweig, Germany

[73] Assignee: Deutsch Forschungsanstalt fur Luft-und Raumfahrt e.V., Bonn, Germany

[21] Appl. No.: 08/694,817

[22] Filed: Aug. 9, 1996

[30] Foreign Application Priority Data

Aug. 11, 1995 [DE] Germany .............................. 195 29 706

[51] Int. Cl.⁶ ...................................................... B64C 1/26
[52] U.S. Cl. ........................... 244/123; 244/131; 244/133; 416/230 A; 416/241 A
[58] Field of Search .................................... 244/123, 131, 244/132, 133; 416/230 A, 241 A

[56] References Cited

U.S. PATENT DOCUMENTS

| | | | |
|---|---|---|---|
| 3,487,879 | 1/1970 | McCarthy et al. | 416/241 A X |
| 3,950,115 | 4/1976 | Euler | 244/123 X |
| 4,037,990 | 7/1977 | Harris | 416/241 A X |
| 4,098,559 | 7/1978 | Price | 416/241 A X |
| 4,228,976 | 10/1980 | Eiselbrecher et al. | 244/133 X |
| 4,292,009 | 9/1981 | Weiland et al. | 416/230 A X |
| 4,382,712 | 5/1983 | Buchs et al. | 244/131 X |
| 4,696,623 | 9/1987 | Bost | 416/230 A |
| 4,892,462 | 1/1990 | Barbier et al. | 416/241 A X |
| 4,966,527 | 10/1990 | Merz | 416/241 A X |
| 5,496,002 | 3/1996 | Schütze | 244/131 X |

FOREIGN PATENT DOCUMENTS

| | | |
|---|---|---|
| 15 31 374 A1 | 9/1967 | Germany . |
| 15 06 573 (PS) | 3/1970 | Germany . |
| 24 51 860 A1 | 7/1975 | Germany . |
| 24 55 810 A1 | 6/1976 | Germany . |
| 27 58 086 A1 | 6/1979 | Germany . |
| 43 29 744 C1 | 9/1994 | Germany . |
| 8 63 115 | 3/1961 | United Kingdom . |
| 1 235 508 | 6/1971 | United Kingdom . |
| 1 484 179 | 9/1977 | United Kingdom . |
| 16 00 065 | 10/1981 | United Kingdom . |
| 22 43 589 | 11/1991 | United Kingdom . |

OTHER PUBLICATIONS

Abstract of FR 1,255,075 (translated).

*Primary Examiner*—Robert J. Oberleitner
*Attorney, Agent, or Firm*—Salter & Michaelson

[57] ABSTRACT

An aircraft with supporting wings including wing shells with good shear strength made of fibrous composite materials, particularly fiber-reinforced plastics, having members taking up tensile and compressive forces on the inside of the wing shells. The members have unidirectional fibers extending longitudinally of the wing, and fixing elements which can be joined detachably to fuselage attachments are provided on the members at the root end of the wing. Stringers are constructed on the inside of the wing shells and spaced longitudinally of the shells, their fiber component being formed by a fiber layer joined to the fiber layer of the wing shell. Fiber bundles are arranged between spaced stringers as unidirectional stiffening elements. The fiber bundles are embedded in the synthetic resin matrix of the plane load-bearing structure and extend longitudinally of the supporting wing. Groups of three fiber bundles extending adjacent each other are provided, of which the two outer bundles in each case form a loop at the root of the supporting wing to receive a bolt which has to be inserted in the loop perpendicular to the plane of the two fiber bundles. The inner bundle is turned down to form a second loop perpendicular to the first loop to receive a bolt which has to be inserted in and perpendicular to the plane of this loop. Both bolts act as connection members to attachment members on the fuselage.

26 Claims, 6 Drawing Sheets

AIRCRAFT WITH SUPPORTING WINGS HAVING MEMBERS FOR TAKING UP TENSILE AND COMPRESSIVE FORCES

FIELD OF THE INVENTION

The invention relates to an aircraft with supporting wings comprising wing shells with good shear strength made of fibrous composite materials, particularly fiber-reinforced plastics, wherein members taking up tensile and compressive forces are provided on the inside of the wing shells. The members have unidirectional fibers extending longitudinally of the wing, and fixing means which can be joined detachably to fuselage attachments being provided on the members at the root end of the wing. It also relates to a corresponding plane load-bearing structure.

BACKGROUND OF THE INVENTION

Wing shells of this type generally comprise the wing skin and stringers connected to it. Longitudinal forces are transmitted both by the skin and the stringers. In known wings the stringers or other members increasing the flexural strength are stuck to the wing skin. However, adhesion creates problems relating to the damage tolerance of the shell, particularly partial detachment of individual stringers from the wing shell as a result of impact loads, with ensuing propagation of the damage at a damaged location. Consequently skin-stringer connections are frequently secured by rivets in addition to the adhesion joint.

DE 43 29 744 C1 describes a wing in which rods, comprising a tubular wall of fibrous composite material on a foam core with at least one layer of paraxial unidirectional fibers and a superimposed fabric tube with fibers intersecting at an angle to the axis of the rod, are used to obtain the necessary flexural strength. The rods, which also act as stringers, are combined in pairs of bundles of three which are provided with a sheath wing good shear strength and are stuck to the interior of the wing shell side by side. At the root of the wing the rods are provided with rotationally symmetric connecting members for axial introduction of tensile and compressive forces. The connecting members are provided with a coaxial connecting screw thread into which fixing screws are driven, these being screwed into the thread through a connecting rib on the fuselage. With this design the rods must be arranged with the axes perpendicular to the rib at the wing root. However, this limits the choice of position for the straight rods within the wing shell. Apart from the fact that adhesion joints are used here too, this construction can only be applied to wings where an appropriate proportion of the rods can extend in a straight line to the tip of the wing, at right angles to the rib at the wing root.

SUMMARY OF THE INVENTION

The object of the invention is to construct a wing of the generic type so that the wing, including all the stiffening elements, can substantially dispense with adhesion joints and the connection can be made with attachment members, which may be located within a wide angular range relative to the longitudinal direction.

According to the invention the object is met by an aircraft with supporting wings comprising wing shells with good shear strength made of fibrous composite materials, particularly fiber-reinforced plastics, wherein members taking up tensile and compressive forces are provided on the inside of the wing shells, the members having unidirectional fibers extending longitudinally of the wing, and fixing means which can be joined detachably to fuselage attachments being provided on the members at the root end of the wing. Stringers are constructed on the inside of the wing shells and spaced longitudinally of the shells. Their fiber component is formed by a fiber layer joined to the fiber layer of the wing shell. Fiber bundles are arranged between spaced stringers as unidirectional stiffening elements, are embedded in the synthetic resin matrix of the plane load-bearing structure and extend longitudinally of the supporting wing. Groups of three fiber bundles extending adjacent each other are provided, of which the two outer bundles in each case form a loop at the root of the supporting wing to receive a bolt which has to be inserted in the loop perpendicular to the plane of the two fiber bundles, the bolt acting as a connecting member to attachment members of the fuselage.

Preferably the inner fiber bundle forms a loop perpendicular to the plane of the two outer bundles to receive a bolt which has to be inserted in this loop. This second loop has an offset to the first loop towards the wing tip and is formed by turning the central fiber bundle downward and connecting its end section with the central bundle to receive a bolt which has to be inserted perpendicular to the plane of the loop, the bolt acting as a connecting member to attachment members on the fuselage.

The invention also proposes a plane load-bearing structure with at least two load-bearing structure elements to be joined. Stringers are constructed on the inside of the shells and spaced longitudinally of the shells, their fiber component being formed by a fiber layer joined to the fiber layer of the structural shell. Fibre bundles are arranged between spaced stringers as unidirectional stiffening elements, are embedded in the synthetic resin matrix of the plane load-bearing structure and extend longitudinally of the shell structure. Groups of three fiber bundles extending adjacent each other are provided, of which the two outer bundles in each case form a loop at the end region of the shells to receive a bolt which has to be inserted in the loop perpendicular to the plane of the two fiber bundles, the bolt acting as a connecting member.

Preferably, the inner bundle forms a loop at the end of the supporting structure perpendicular to the plane of the outer bundles to receive a bolt which has to be inserted in the loop perpendicular to the plane of this loop, the bolt acting as connection member to attachment members of another load bearing structure element to be joined. The inner loop is formed by turning the central fiber bundle by a tapered overlap.

Loops as anchoring members for fiberglass-reinforced members are known, for example, from DE-PS 1 506 573. However, this specification only provides for the plastic material molded into an end loop to be secured between two metal shells, which then form the actual anchorage. There is similar provision in DE-OS 1 531 374, where there is a division into a plurality of loops with definition of the relative positions. DE 24 55 810 A1, DE 27 58 086 A1 and DE 24 51 860 A1 are also concerned with anchorage in loop form, but not with the continuation of the anchorage in a craft wing or other plane load-bearing structure as a local stiffening element between stringers.

Wings according to the invention can be made particularly appropriately by injecting resin into the dry-fabricated fiber components.

Plastics reinforced with carbon fibers are particulary preferred.

High damage tolerance is obtained for the wings and the fuselage connections through the embedding of all the fiber components in the synthetic resin matrix of the wing shells, in conjunction with the construction of the unidirectional fiber bundles extending longitudinally of the wing. The layout of the fiber bundles must be designed so that, even if a predetermined number of bundles or connections is damaged, the aircraft's flying and maneuvering capabilities will be maintained.

BRIEF DESCRIPTION OF THE DRAWINGS

The preferred embodiments are described below, by way of example only, with reference to the accompanying drawings, in which.

DESCRIPTION OF THE PREFERRED EMBODIMENTS

Figure 6:
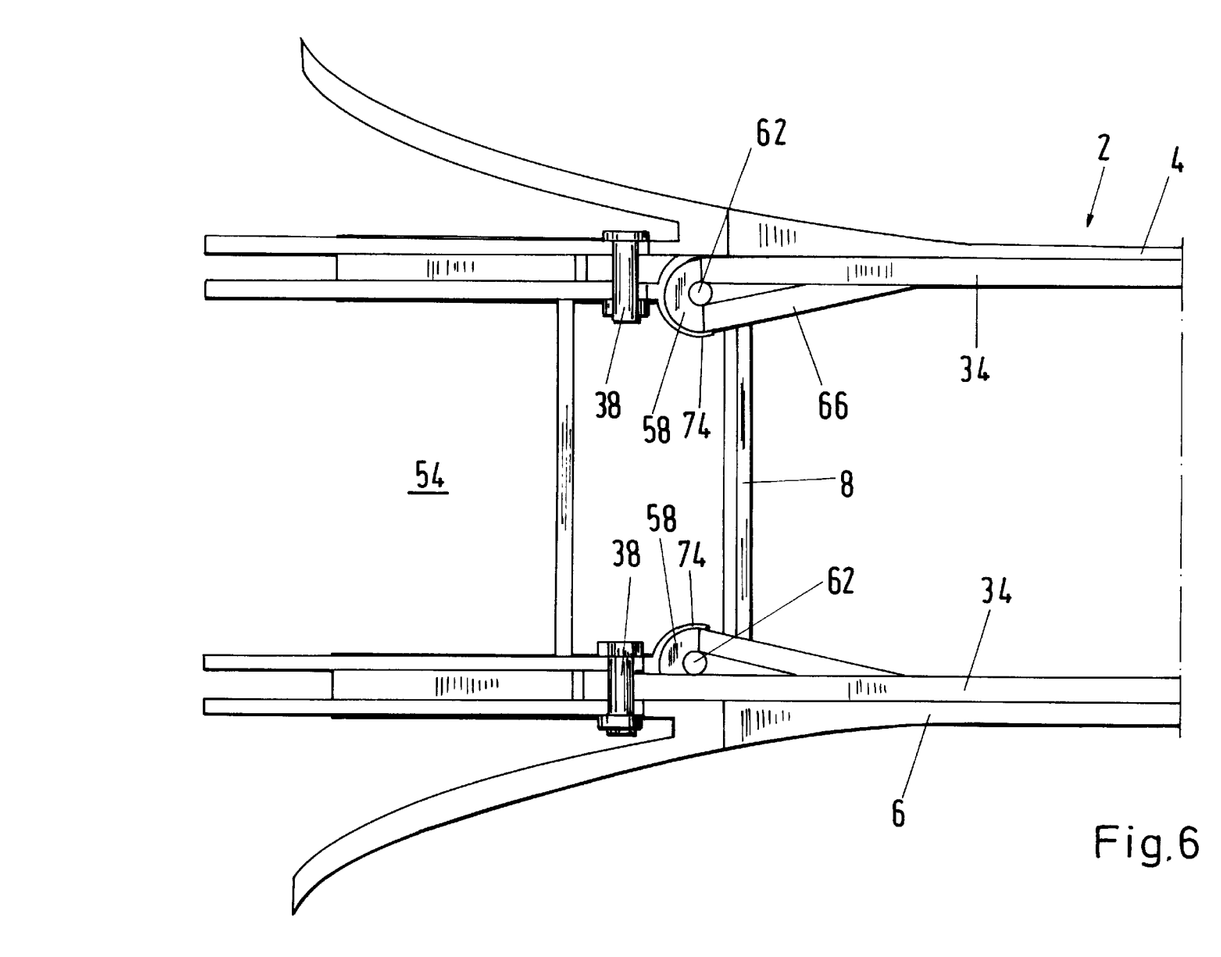
FIG. 6 is a section taken in the region of the line V—V in FIG. 1, through a complete wing attachment.

In a preferred embodiment of aircraft with supporting wing, the wing 2, of which FIG. 6 shows the root end in longitudinal section, has an upper shell 4 and a lower shell 6. The shells are interconnected by transverse ribs, of which the wing root rib 8 is shown in the drawing. The shells are further interconnected by longitudinal walls (not shown), forming a wing spar box.

Figure 3:
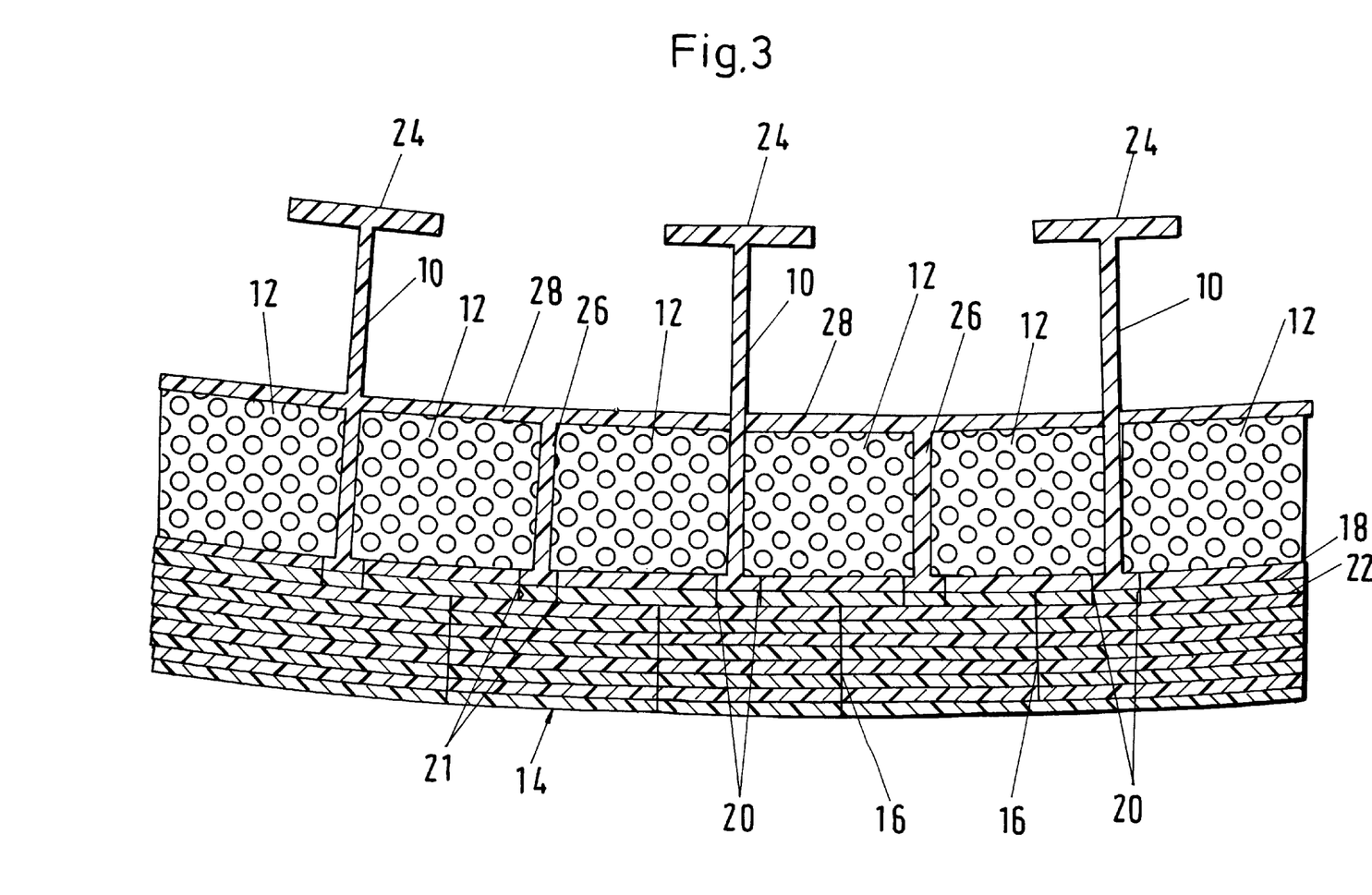
FIG. 3 is a section taken in the region of the line III—III in FIG. 1.

The wing shells 4 and 6 are made of fibrous composite materials. The skin of the shells is made with good shear strength in known manner. Longitudinally extending stringers are provided on the inside of the shells and shown not in FIG. 6 but in FIG. 3. Stiffening elements 12, which are each unidirectional, are arranged between the stringers 10. They are in the form of bundles of unidirectional fibers with the individual fibers extending longitudinally of the wing. The shell has a plurality of fiber layers 14. The thickness of the skin and thus the number of fiber layers depends on the stress on the shells in the respective regions. The layers are fabricated dry, and the individual fiber layers are joined together by perpendicular seams 16.

The stringers 10 may be formed by folding the uppermost layers of skin 18. These layers are fixed by seams 20 at least to the layer 22 below, in the region of the root of the stringers 10. Here the stringers 10 formed by folding are T-shaped at their upper end. Alternatively a one-sided limb may be provided instead of two limbs 24 extending in opposite directions. Dividing walls 26 are provided between the stringers 10; like the stringers they are formed by folding the uppermost skin layers 18, and they are similarly joined by seams 21 at least to the layer 22 below. The unidirectional stiffening elements 12 are each held in the wing shell on three sides with good shear strength by means of the uppermost layer 18, the adjoining walls of the stringers and the intermediate wall. With an upper cover 28 a complete enclosure is obtained for the unidirectional stiffening elements 12, with good shear strength. The edges of the cover 28 may be taken laterally upwards at the stringers, thus producing additional stiffening of the stringers. An additional unidirectional cover may also be provided to increase the transverse flexural strength. The folding and other structural details are not shown in FIG. 3. All the above mentioned fiber components of the shell are embedded in a common synthetic resin matrix. The wing shell may be fabricated dry by stitching. The resin is then applied in an injection process.

The above mentioned seams or stitching are a safeguard against delamination of the layers. The stitching threads embedded in the matrix have to be inserted in the layers to that they run in the direction of the local stress in the region of the seams. At the foot of the stringers and intermediate walls the threads may therefore run obliquely in the layers.

With the wing shell construction described above the take-up of tensile and compressive forces has hardly any interaction with torsion forces which occur in the shells. The stiffness can be adapted almost continuously be changing the cross-section of the fiber bundles and the thickness of the torsion skin. The unidirectional stiffness of the various fiber bundles may further be oriented in accordance with aeroelastic principles, for example to obtain a desired bending-torsion coupling.

Supporting wings with wing shells of the type described are distinctive in having great damage tolerance; in particular, propagation of dame, e.g., propagation of a crack is almost impossible. The attachment members to be described below give high damage tolerance even in the attachment region.

Figure 1:
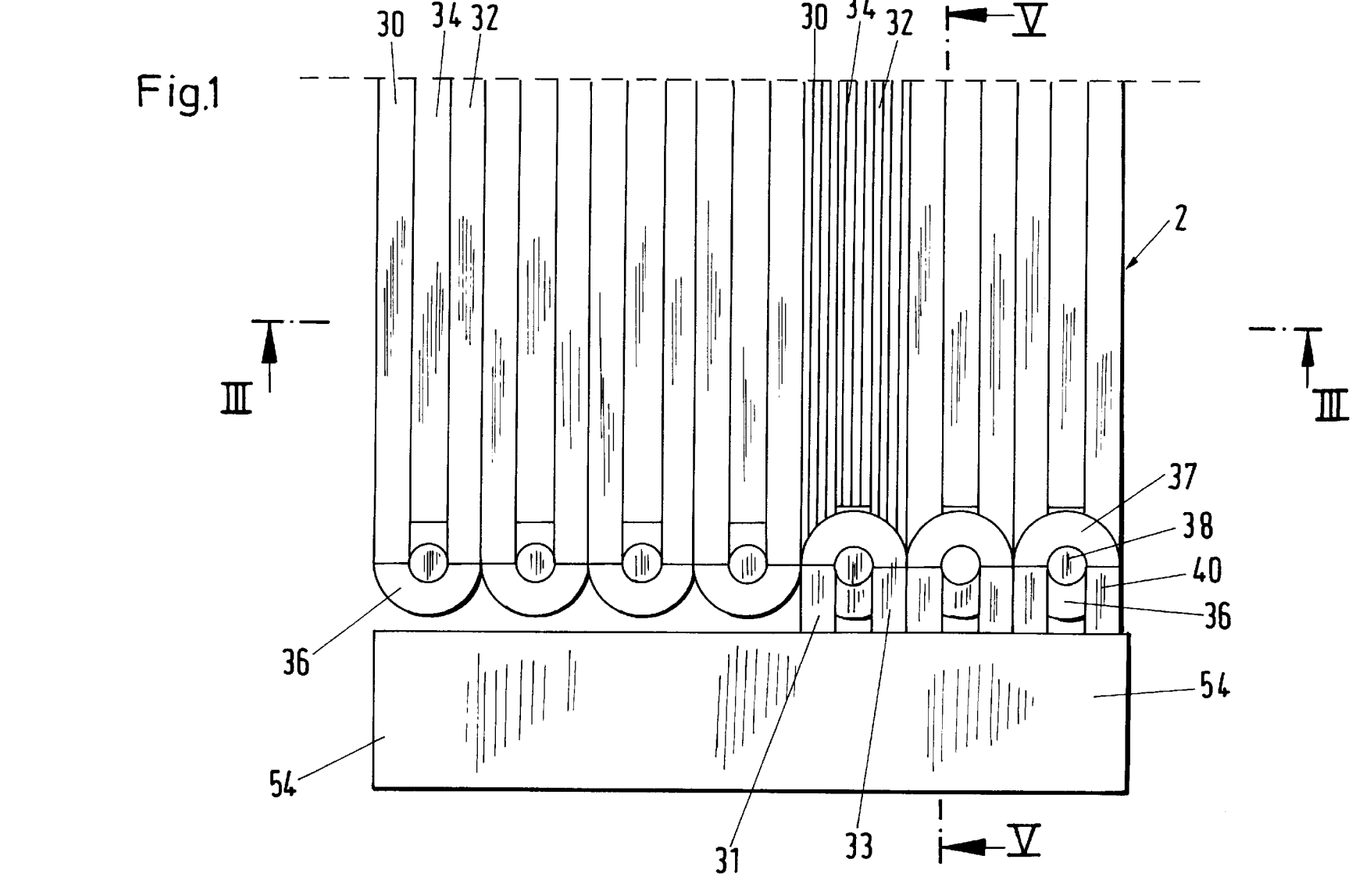
FIG. 1 is a plan view of the fuselage and wing attachment region in the preferred embodiment.
Figure 2:
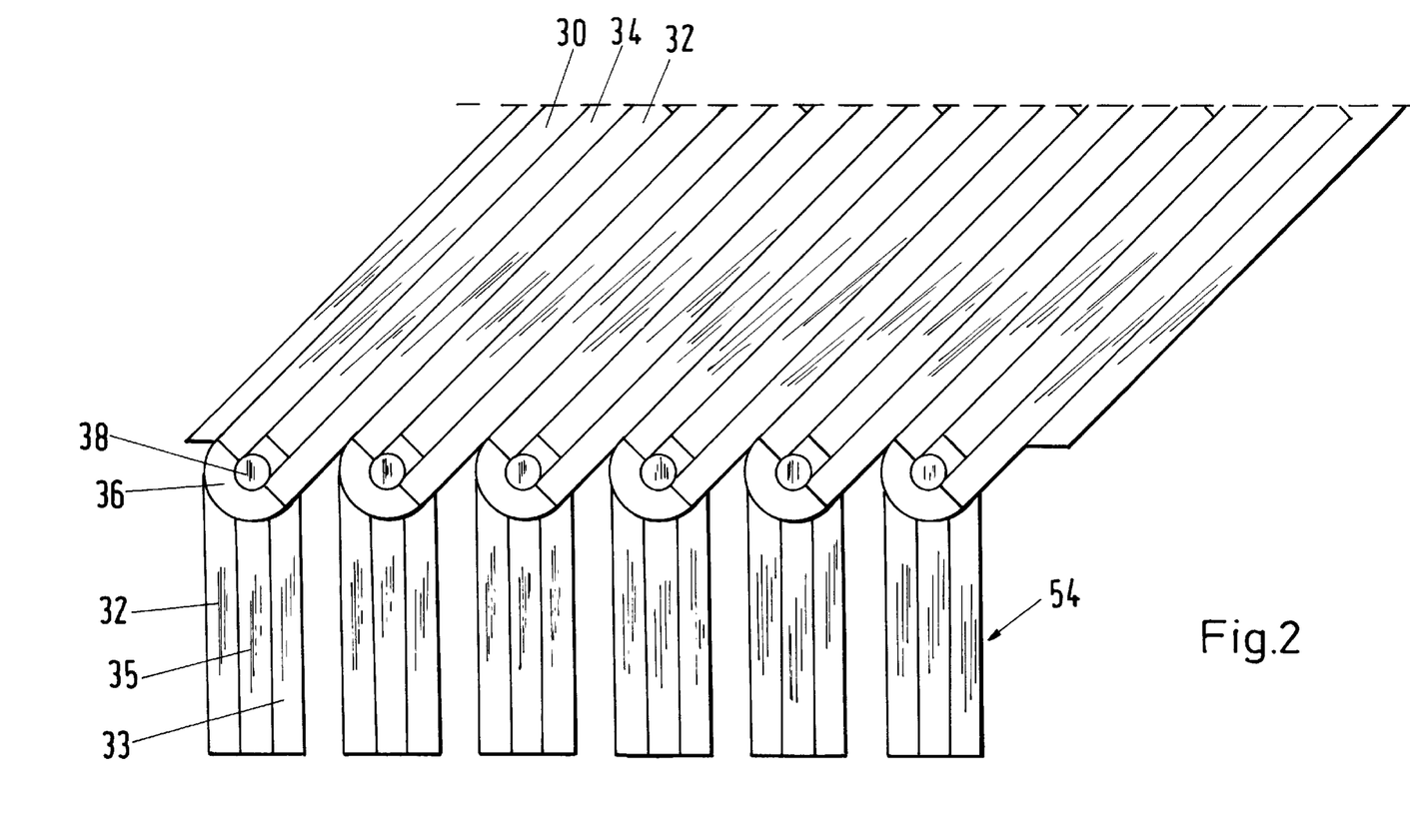
FIG. 2 is a plan view similar to FIG. 1, of a second embodiment.
Figure 4:
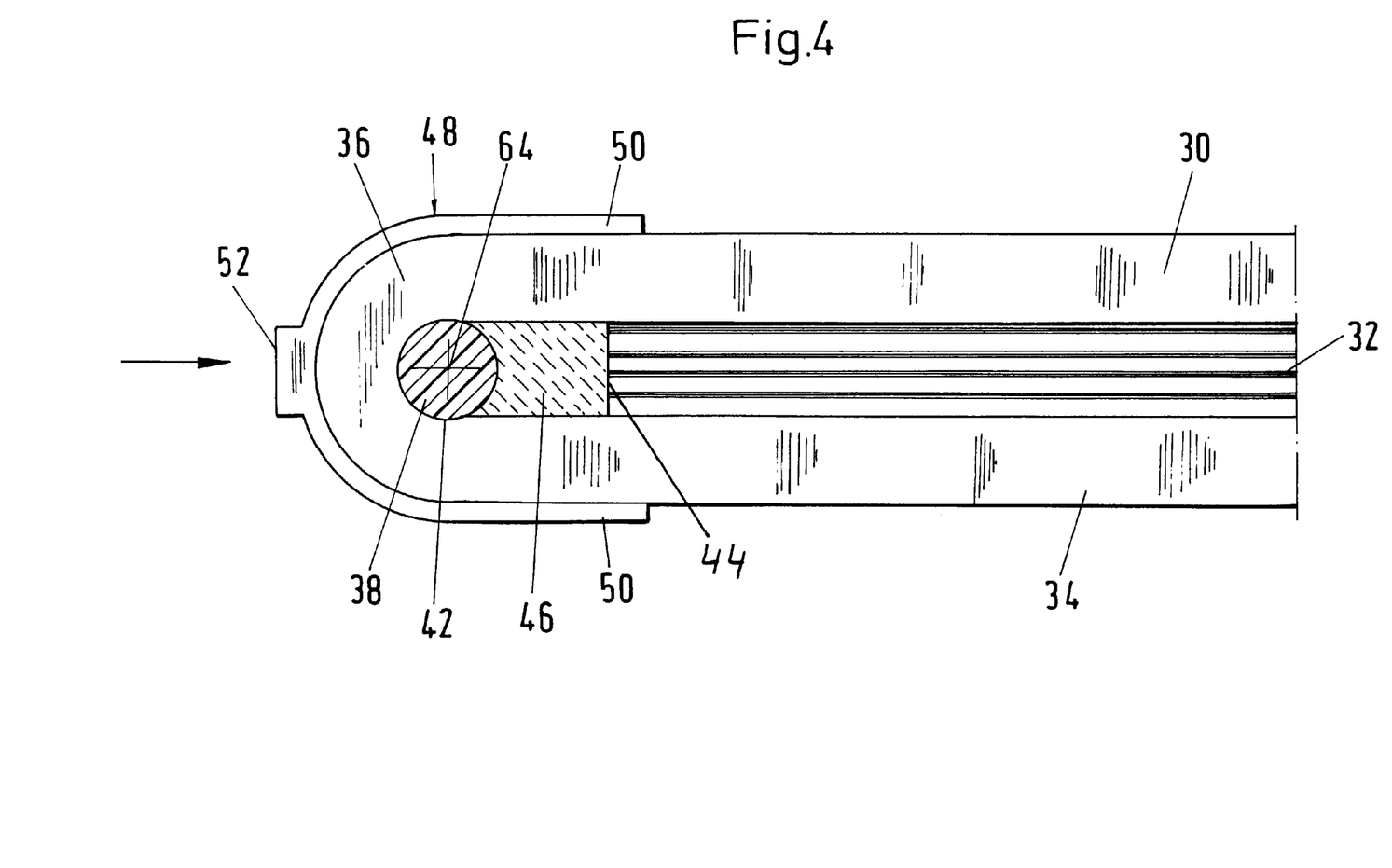
FIG. 4 is a plan view of a detail of the attachment at the wing.

As shown in FIGS. 1 and 2, three adjacent fiber bundles 30, 32, 34 are used in each case to make the wing attachments, the two outer bundles 30, 32 being turned round to form a loop 36 at the root of the supporting wing. The function of the loop is to receive a bolt 38 with its axis extending perpendicular to the plane of the two fiber bundles. The bolt acts a connection to the attaching members 40 on the fuselage. A metal bush 42 is preferably provided in the loop 36 to receive the bolt 38. As can be seen in FIG. 4 the central fiber bundle may have its wing root end 44 butting directly against the bush 42 or against a pressure-resistant packing member 46. In that case exclusively compressive forces are transmitted to the attachment through the central fiber bundle 34.

A supporting member 48 surrounding the loop with a looping angle of 180° is provided to transmit compressive forces acting in the two outer fiber bundles 30, 32; it should have straight limb ends 50 adjoining the curved portion and extending over the adjoining straight section of the fiber bundles 30 and 32 as shown in FIG. 4. The member 48 is shown with a supporting surface 52, with which it bears against supporting surfaces on the central wing box 54. Attachment fittings containing holes to receive the bolt 38 are provided on the central wing box. In this way compressive forces can be transmitted to the box directly through bracing members, while tensile forces are taken into the box through the bolts 38.

Figure 5:
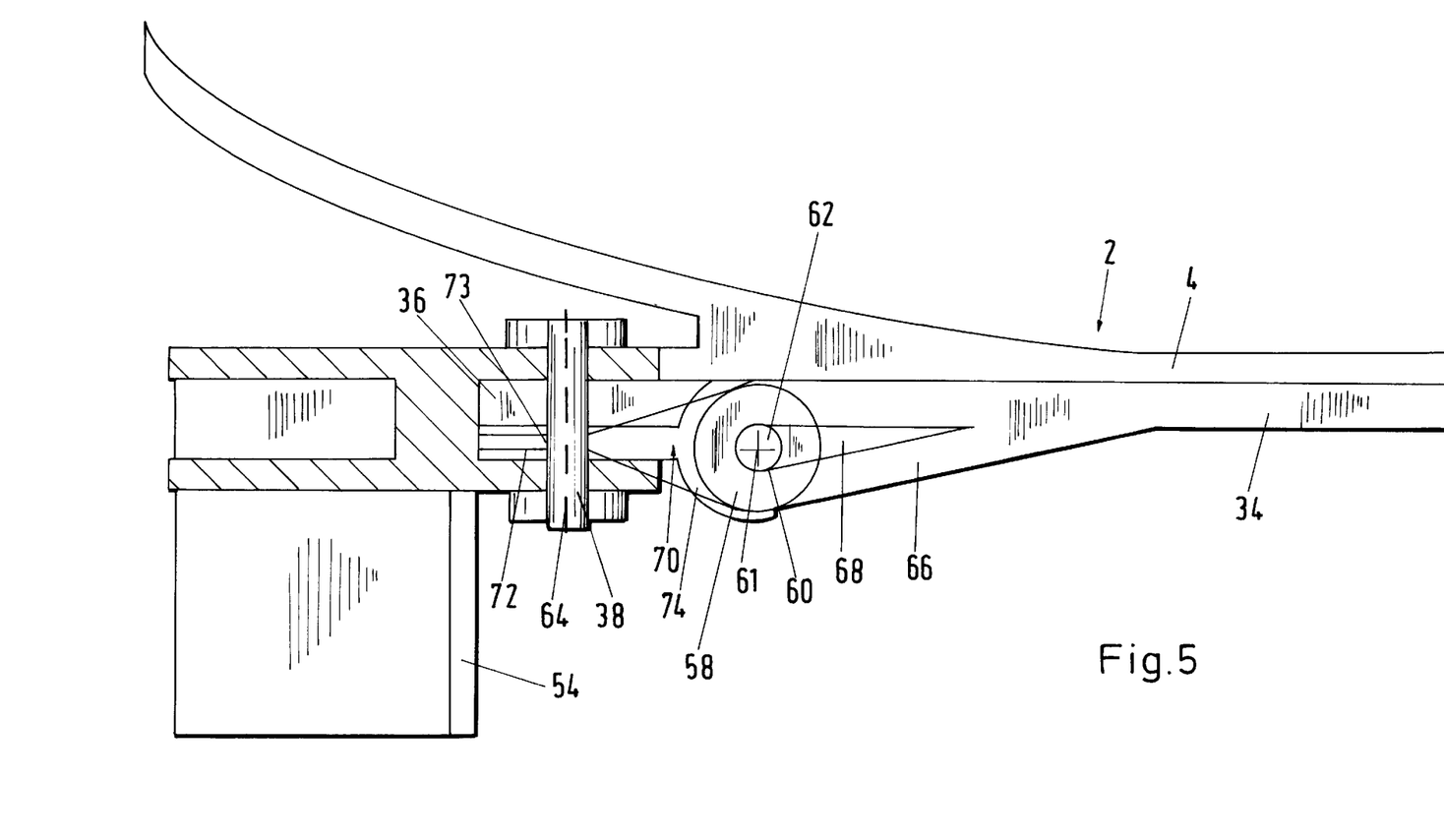
FIG. 5 is a section view taken in the region of the line V—V in FIG. 1.

If requirements are particularly high the central fiber bundle 34 may also be constructed and attached so that tensile as well as compressive forces are transmitted to the box from it. For this purpose a loop 58 may also be formed in the central fiber strand 34 as shown in FIG. 5. A bush 60 is arranged in the loop 58. The axis 61 of the bush 60 and thus of the loop 58 is turned through 90° from the axis 64 of the loop 36 formed by the two outer fiber bundles. The loop 58 is offset from the loop 36 towards the interior of the wing.

The loop 58 is formed by turning round the central fiber bundle 34. The side 66 running back is tapered inito the side running into the loop, and a pressure-resistant packing member 68 is provided in the gap.

As illustrated in FIG. 5 the loop 58 is fixed to an intermediate fitting 70 by a bolt 62. The fitting has a flange attachment 72 containing a hole 73 through which the bolt 38 passes. The bolt thus also transmits the tensile and compressive forces from the central fiber bundle 64. The intermediate fitting further has a supporting shell 74 which loops around the loop 58 substantially through 180° and against which the loop lies positively and without any play. The flange 72 may also be provided with a supporting surface similar to the supporting surface 52 for the loop between the two fiber strands 30, 32, with which the fitting 70 can bear against the central wing box 54.

It is possible to provide loops and corresponding intermediate fittings 70 for the central fiber bundle 34 only for the lower wing shell, where there are higher tensile stresses on the fiber bundles.

The attaching members of the central wing box may, in the same way as the attaching members on the wing, be formed by parallel fiber bundles with three parallel bundles 31, 33, 35 in each case, the outer bundles 31, 33 each being formed into a loop 37. Such a construction is shown theoretically in FIGS. 1 and 2. It gives high damage tolerance even in the central wing box. However, it is also possible to provide spaced high-strength metal flanges on the central wing box.

To alleviate the problems which would be expected with double fits, provision is made for the holes giving passage to the attaching bolts to be drilled true to size after a defined application of the supporting surfaces, or alternatively for a mold device corresponding to the attachment region of the central wing box to be used and the pre-tensioned fiber bundles to be cured in that device. The original attachment fitting may also be used for that purpose instead of a device.

As will be seen from FIGS. 1 and 2, the wing attachment according to the invention as described above may be applied to either straight or backswept wings. The connection for a straight wing is represented in FIG. 1 and that for a backswept wing in FIG. 2. In the case of backswept wings there is the further advantage that, with the central fiber bundles attached with tensile strength, the axes 62 of the attachment loops 58 are offset from each other, thus allowing particularly easy access for inserting the bolts 62.

The formation of suitable supporting surfaces on the central wing box enables the attachments to be kept free of hysteresis. At the tension side the stresses are taken up directly by the unidirectional fibers of the fiber bundles. At the compression side the fibers are completely supported transversely in the positive bracing member, so that uniform stress distribution is obtained at the point where the wing-side unidirectional element joins the fitting. The arrangement of the attachments in a predetermined line without any gaps enables all the bending forces, and quite generally all longitudinal, transverse and shearing forces, to be transmitted uniformly from the wings to the attachments.

The torsion and transverse forces are taken directly into the wing root owing to the incorporation of a stiff sold wall rib in it. In the region of the loops there are therefore only longitudinal forces in the direction of the fiber bundle orientation. A stiff angular fitting joining the row of loops to the root rib can convey the torsion forces directly into the attachment bolts.

High damage tolerance is obtained for the central wing box through giving it a structure corresponding to that of the wing shells, and particularly through also using groups of three parallel fiber bundles in the box.

It will be clear from the above that the construction described gives a large number of attachment points between the wing and the fuselage. If the individual elements are appropriately dimensioned, a specifiable percentage of sub-elements will be capable of fulfilling the requirements of the total force connection. The specified number and position of the connections can be calculated according to the amount of permissible damage with which the structure, stressed to the maximum operating load, can still survive. This is thus a high-grade fail-safe concept. Damage to a certain number of sub-groups will not stop the whole structure, i.e. the aircraft, from being further operated under full operative loads, owing to the independence of the sub-groups in their force transmission function.

Wing shells according to the invention are homogeneous components with thin walls. They can therefore be tested simply and very safely by non-destructive methods such as ultrasound.

Wing sections may also be joined together by connections as described above. For example, an outer wing may be joined to the main wing with such connections. As the forces to be taken up in the outer wing are very much weaker than at the wing root, such a connection may be made with correspondingly fewer attachment members and parts with good shear strength. The attachment members described may also enable the outer wings to swing up or down. Adjacent loops with a horizontal axis, i.e. loops like loop 58 in the upper wing shell in FIG. 5, may form hinges about which the end wings can be swing upwards after the lower connection bolts are disengaged. The other bolts, whether horizontal or vertical, can then be operated e.g. by hydraulic drives and can be engaged and disengaged.

Supporting wings of the type described are plane load-bearing structures. The attachments and construction of the plane load-bearing structures according to the invention can therefore also be applied to other conditions of use. The bridge elements on self-propelled bridge building vehicles—bridge laying tanks—can be given as an example here. Such bridge elements may be constructed with an upper and lower shell joined by side and possibly intermediate walls as well as transverse walls to form a highly rigid box. As in the swinging wings mentioned, loops with a horizontal axis may form hinges which enable the bridge elements to be folded together for transportation. The rigid connection in the operative position may be produced by axially displaceable bolts. If the hinges are arranged on the lower shell and the upper shell of the bridge elements is thus only loaded in compression, connecting bolts or the like for the parts with good unidirectional strength in the upper shell can be dispensed with without affecting the high damage tolerance inherent in the upper shell structure.

It is to be understood that modifications may be made to the above described embodiments within the scope of this invention, which is to be construed on the basis of the following claims.

We claim:

1. An aircraft comprising:

supporting wings including wing shells made of fibrous composite materials, the wing shells having a fiber layer and in the insides thereof members taking up tensile and compressive forces, the members having unidirectional fibers extending longitudinally of the wing and fixing means which can be joined detachable to fuselage attachments being provided on the members at a root end of the wing;

stringers constructed on the inside of the wing shells and spaced longitudinally of the shells, the stringers having a fiber component formed by a fiber layer joined to the fiber layer of the wing shell;

fiber bundles arranged between spaced ones of the stringers as unidirectional stiffening elements, the aircraft having a load-bearing structure of a synthetic resin matrix; the fiber bundles being embedded in the synthetic resin matrix and extending longitudinally of the supporting wing;

and groups of three fiber bundles extending adjacent each other, of which the two outer bundles of each group of three bundles form a first loop at the root of the supporting wing to receive a first bolt which is inserted in the loop perpendicular to a plane of the two fiber bundles, the bolt acting as a connecting member to attachment members on the fuselage.

2. The aircraft of claim 1 further comprising a bush arranged in the loop of the two outer bundles on which a central fiber bundle of a group is supported at the end.

3. The aircraft of claim 1 further comprising supporting elements interacting with the outside of the loop to take up compressive forces acting longitudinally of the outer fiber bundles.

4. The aircraft of claim 3, wherein the supporting elements surround the loop externally over an arc of 180°.

5. The aircraft of claim 3 further comprising supporting surfaces on the fuselage for the supporting elements.

6. The aircraft of claim 1, wherein the groups each comprising three fibre bundles cover substantially the whole area of the wing shells.

7. The aircraft of claim 1, wherein a central fiber bundle of a group at the root of the wing is shaped into a second loop to receive a second attachment bolt, the second loop being rotated through 90° relative to the first loop, which is formed from the outer bundles of the group.

8. The aircraft of claim 7, wherein the first and second attachment bolts have respective axes, the axis of the second attachment bolt being offset from the axis of the first attachment bolt towards the wing.

9. The aircraft of claim 7 further comprising a tapered overlap which connects to the central fiber bundle the end section of the central fiber bundle which is turned round into a loop.

10. The aircraft of claim 7 further comprising intermediate fittings which can be loaded by tensile and compressive forces, the intermediate fittings having means to receive the first and second attachment bolts.

11. The aircraft of claim 10 further comprising intermediate fittings having supporting elements, against which the second loop lies and which surround the second loop externally over an arc of 180°.

12. The aircraft of claim 1, wherein the attachment members on the fuselage have groups with three unidirectional fiber bundles as stiffening elements, of which the outer bundles form a loop to receive a fixing bolt, which has to be inserted in the loop perpendicular to the place of the two fiber bundles.

13. The aircraft of claim 12, wherein the central fiber bundles of a group is supported at the end against a bush arranged in the loop of the two outer bundles.

14. The aircraft of claim 13 further comprising supporting elements interacting with the outside of the loop to take up the compressive forces acting longitudinally of the outer fiber bundles.

15. The aircraft of claim 1 further comprising:

a supporting wing section which can be swung upwards;

loops formed at the adjoining ends of the two wing sections and comprising unidirectional fiber bundles, at least two spaced loops with a horizontal axis being constructed as hinge elements in the region of the upper wing shell, and detachable connecting members being provided for the other pairs of loops.

16. A plane load-bearing structure with at least two load-bearing structure elements to be joined, comprising:

shells having a fiber layer and interiors;

stringers constructed on the inside of the shells and spaced longitudinally of the shells, the stringers having a fiber component formed by a fiber layer joined to the fiber layer of the shell;

fiber bundles arranged between spaced ones of the stringers as unidirectional stiffening elements, the plane load-bearing structure having a synthetic resin matrix in which the fiber bundles are embedded and extend longitudinally of the supporting structure;

and groups of three fiber bundles extending adjacent each other, of which the tow outer bundles of each group of three bundles form a loop at the end region of the shells, to receive a bolt which is inserted in the loop perpendicular to the plane of the two fiber bundles, the bolt acting as a connecting member.

17. The plane load-bearing structure of claim 16 further comprising a bush arranged in the loop of the two outer bundles on which the central fiber bundle of a group is supported at the end.

18. The plane load-bearing structure of claim 16 further comprising supporting elements interacting with the outside of the first loop to take up the compressive forces acting longitudinally of the outer fiber bundles.

19. The plane load-bearing structure of claim 18, wherein the supporting elements surround the loop externally over an arc of 180°.

20. The plane load-bearing structure of claim 18 further comprising an attachment member on which there are provided supporting surfaces for the supporting elements.

21. The plane load-bearing structure of claim 16, wherein the groups each comprising three fiber bundles cover substantially the whole area of the load-bearing structure shells.

22. The plane load-bearing structure of claim 16, wherein the central fiber bundle of a group at the end of the load-bearing structure element is shaped into a second loop to receive a second attachment bolt, the second loop being rotated through 90° relative to the first loop, which is formed from the outer bundles of the group.

23. The plane load-bearing structure of claim 22, wherein the first and second attachment bolts include respective axes, the axis of the second attachment bolt being offset from the axis of the first attachment bolt.

24. The plane load-bearing structure of claim 22 further comprising a tapered overlap which connects to the central fiber bundle the end section of the central fiber bundle which is turned round into a loop.

25. The plane load-bearing structure of claim 22 further comprising intermediate fittings which can be loaded by tensile and compressive forces, the intermediate fittings having means to receive the first and second attachment bolts.

26. The plane load-bearing structure of claim 25, wherein the intermediate fittings have supporting elements which lie against the second loop and surround the second loop externally over an arc of 180°.

* * * * *